April 28, 1970 TAKASHI YANAKA ET AL 3,509,503
OBJECTIVE LENS POLE PIECES
Filed Aug. 28, 1967 3 Sheets-Sheet 1

INVENTORS
TAKASHI YANAKA
KOHEI SHIROTA
BY
Webb, Burden, Robinson & Webb

United States Patent Office 3,509,503
Patented Apr. 28, 1970

3,509,503
OBJECTIVE LENS POLE PIECES
Takashi Yanaka and Kohei Shirota, Tokyo, Japan, assignors to Nihon Denshi Kabushiki Kaisha, Tokyo, Japan, a corporation of Japan
Filed Aug. 28, 1967, Ser. No. 663,678
Claims priority, application Japan, Feb. 27, 1967, 42/12,706
Int. Cl. H01h 7/00
U.S. Cl. 335—210   8 Claims

ABSTRACT OF THE DISCLOSURE

Objective lens pole pieces in which the upper pole piece has an aperture having a diameter greater than the diameter of the face of the lower pole piece and in which the lower pole piece has at least one frusto-conically tapered side wall.

---

Our invention relates to an improvement in objective lens pole pieces for electron microscopes and similar devices, and, in particular, provides pole pieces that diminish both spherical and chromatic aberration while allowing sufficient space for specimen manipulation and for the incorporation of various attachments near a specimen. The performance of an electron microscope, particularly with respect to its resolving power, resides in the degree of spherical and chromatic aberration which can be eliminated. To minimize these aberrations in conventional-type objective lenses, the gap between the pole pieces and the aperture diameter of these pole pieces are made extremely small. However, by making the gap and aperture diameter extremely small, the space between, or within the central opening of, the pole pieces is insufficient to meet the requirements for the various attachments which must be inserted therein.

We have successfully developed objective lens pole pieces that diminish spherical and chromatic aberrations while simultaneously providing adequate space around the specimen for the insertion of various attachments. We have achieved these results using a relatively small amount of excitation current in the pole pieces. For example, a coefficient of spherical aberration of 0.67 mm. was obtained at 7.2 ka. excitation current for objective lens in which the aperture diameter of the upper pole piece was 10 mm. and the gap between the poles was 4 mm. This coefficient is much shorter than that available or obtainable for comparative conventional apparatus. (A detailed explanation is set forth in Aberration Coefficient of Extremely Asymmetrical Objective Lenses, Sixth International Congress for Electron Microscopy, Kyoto, Japan, Aug. 28, 1966.)

The aperture diameter of our upper pole piece is large enough to accommodate various attachments without sacrificing resolving power of the microscope. Even though a large diameter aperture diameter is used, we have found that both the spherical and chromatic aberration may be reduced by forming the lower pole piece with a frusto-conical shape and by minimizing the diameter of the lower pole face. By so constructing the lower pole piece, the magnetic field of the lens is concentrated immediately at the top of the lower pole piece. The magnetic flux at the face of the lower pole piece increases more rapidly than the flux entering the frusto-conical side walls of said pole piece, thereby making the field distribution near the top of the lower pole piece similar to the usual symmetrical objective lens pole piece having extremely small gap and aperture diameter. This construction has resulted in minimizing the aberration and focal length utilizing a relatively small excitation current.

In the accompanying drawings, we have shown preferred embodiments of the invention in which:

FIGURE 8 is a graph showing variation in the chromatic aberration coefficient when the surface angle is 60° and the aperture diameter of the upper pole piece is 22 mm.;

Figure 1:
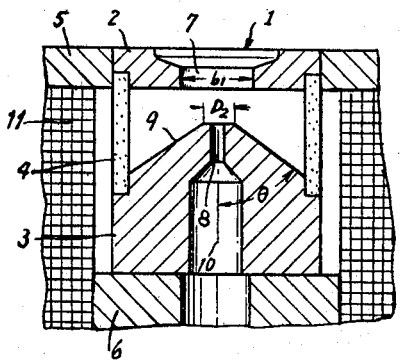
FIGURE 1 is a vertical section through the pole pieces of an objective lens of our construction.
Figure 2:
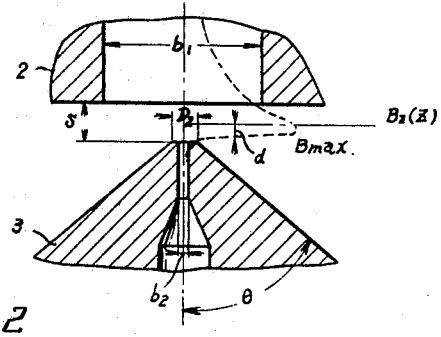
FIGURE 2 is a partial section of the objective lens shown in FIGURE 1 including an axial distribution curve between the upper and lower pole pieces.

Referring to FIGURES 1 and 2, 1 represents an asymmetrical objective lens pole piece. Upper pole piece 2 is spaced from lower pole piece 3 by means of a nonmagnetic material 4. Pole pieces 2 and 3 have beam passages 7 and 8, respectively, that are coincident with each other. These pole pieces are connected to the ends of the objective lens yokes 5 and 6. Lens coil 11, excited by an energizing current, is adapted to excite the pole pieces greater than that required for saturation. Upper pole piece 2 has an aperture diameter $b_1$ larger than the lower pole piece face diameter $D_2$. Conical surface 9 of the lower pole piece 3 has an angle $\theta$ with respect to lens axis 10.

Figure 3:
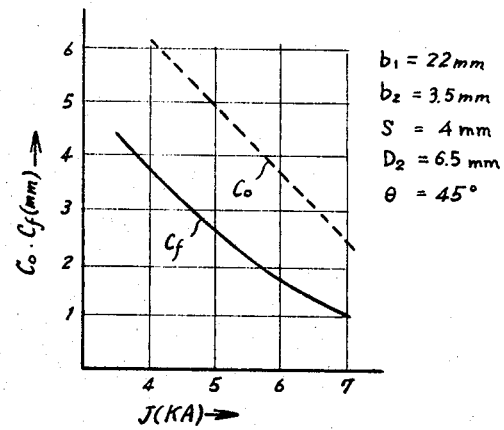
FIGURE 3 is a graph showing variation in the spherical and chromatic aberration coefficients as a function of excitation current in a lens using our pole pieces.

The magnetic field distribution located at the gap between upper pole piece 2 and lower pole piece 3 of the asymmetrical objective lens is shown in FIGURE 2. As is apparent from this figure, the point where the field strength becomes maximum (B max.) is lower than one half the distance between pole pieces 2 and 3. In the region of saturation of the lens pole pieces, the maximum field and half width $d$ of the image side field distribution are not only varied by increasing the excitation current of the pole pieces, but are also altered by changing the geometry of the pole pieces, such as lower pole face diameter $D_2$, frusto-conical surface angle $\theta$, gap S, and aperture diameter $b_1$. As shown in FIGURE 3, the spherical and chromatic aberration coefficients can be considerably reduced by increasing the excitation current J(KA). The representative curves of FIGURE 3 were obtained in a lens wherein $b_1$ was 22 mm., $b_2$ was 3.5 mm., S was 4 mm., $D_2$ was 6.5 mm., and $\theta$ was 45°. In this case, the saturation region of the lower pole piece is approximately 4 ka. excitation current.

Figure 4:
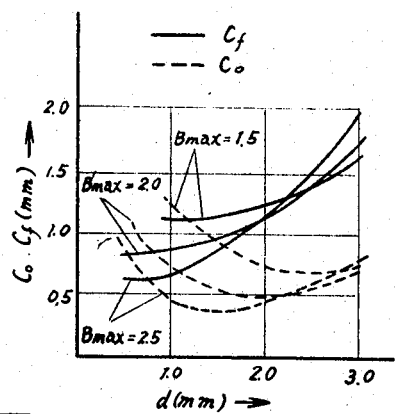
FIGURE 4 is a graph showing variation in the spherical and chromatic aberration coefficients as a function of the half width $d$ of various values of maximum field shown in FIGURE 2.

The graph of FIGURE 4 shows the variation in the values of spherical aberration coefficient $C_0$ and chromatic aberration coefficient $C_f$ as a function of the half width $d$ for various values of maximum field (B max.). Generally, half width $d$ is a constant until the pole piece is saturated, thereafter, the half width rapidly increases.

In the unsaturated region, therefore, spherical and chromatic aberration coefficients can be diminished by increasing the excitation current. On the other hand, when the pole piece is saturated the maximum field (B max.) will continue to increase while chromatic aberration coefficient $C_f$ diminishes. Therefore, it is assumed that the spherical aberration coefficient $C_o$ also decreases. It has been found that the spherical aberration coefficient $C_o$ is reduced even though the chromatic aberration coefficient has been prevented from decreasing. This is because of the half width $d$, which is increasing to the optimum value of the spherical aberration coefficient, for example, from 1.0 mm. to 1.5 mm. (FIGURE 4).

Figure 5:
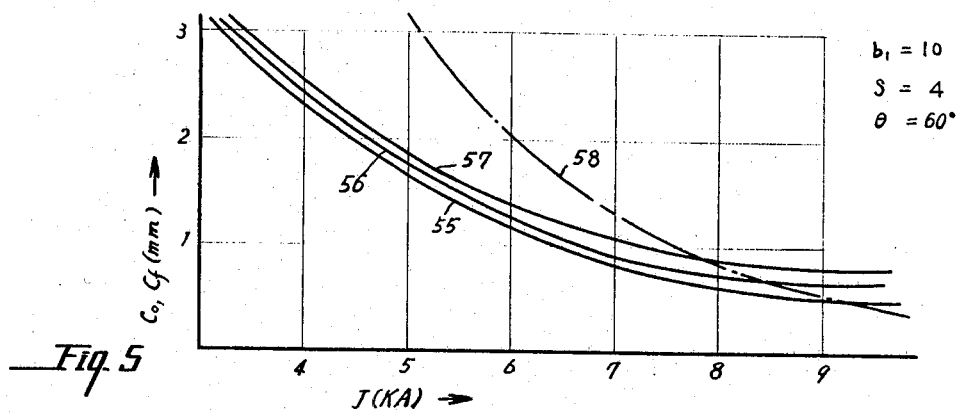
FIGURE 5 is a graph showing variation in the chromatic and spherical aberration coefficients of the asymmetrical objective lens pole piece shown in FIGURE 1 in which the frusto-conical surface angle is 60°.

In all of our experiments we used a JEM7 electron microscope manufactured by Nihon Denshi Kabushiki Kaisha, Japan, operating at an accelerating voltage of 100 kv. Since it may be assumed that the spherical aberration curve varies as does the chromatic aberration coefficient, we have obtained the variation curves of a chromatic aberration coefficient utilizing our novel objective lens pole pieces. The graph of FIGURE 5 illustrates chromatic aberration coefficient $C_f$ and spherical aberration coefficient $C_o$ as a function of excitation current, J(KA), obtained when using the arrangement of FIGURE 1. Curves 55, 56 and 57 represent chromatic aberration curves wherein $b_1$ equals 10 mm., S equals 4 mm., and $\theta$ equals 60°. Curve 55 represents $D_2$ equal to 2 mm. and $b_2$ equal to 0.5 mm., curve 56 represents $D_2$ equal to 4 mm. and $b_2$ equal to 1.0 mm., and curve 57 represents $D_2$ equal to 6 mm. and $b_2$ equal to 1.0 mm. It is obvious from these chromatic aberration curves that a small chromatic aberration coefficient may be established by reducing diameter $D_2$ and by increasing excitation current J(KA). Similarly, curve 58 representing spherical aberration coefficient, also drops down to a low coefficient as in the case of curves 55, 56 and 57. It may be assumed that the maximum field is monotonically increasing since in spite of the adverse effect caused by the increase of half width $d$, the chromatic aberration coefficient continues to decrease. Curve 58 was obtained using the same dimensional factors as for curve 55.

Figure 6:
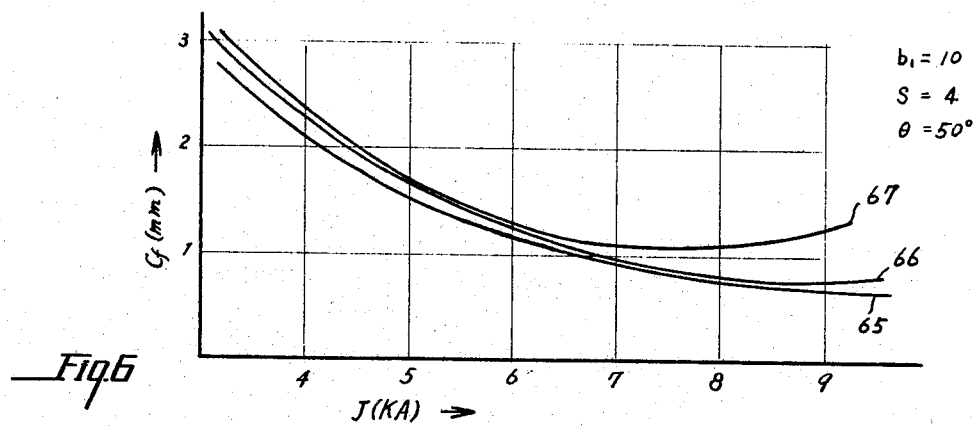
FIGURE 6 is a graph showing variation in the chromatic aberration coefficient when the frusto-conical surface angle is 50°.
Figure 7:
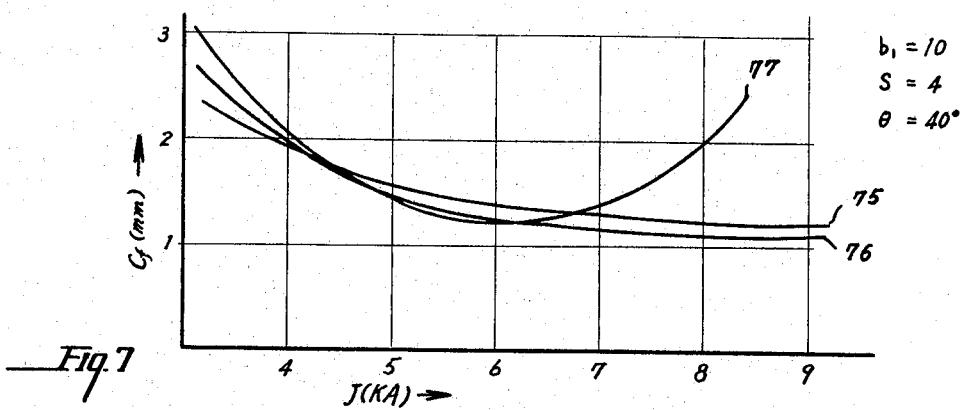
FIGURE 7 is a graph showing variation in the chromatic aberration coefficient when the frusto-conical surface angle is 40°.
Figure 10:
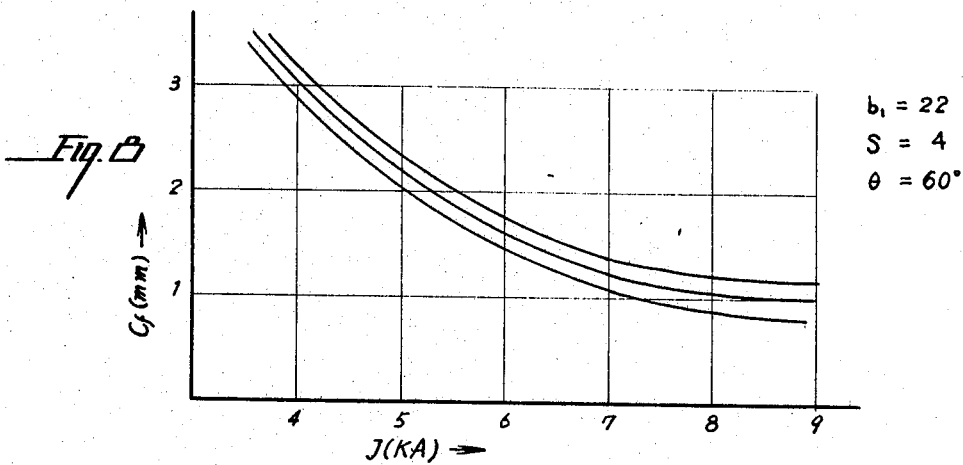

It will be noted from the curves in FIGURES 6 and 7, that the curve of chromatic aberration coefficient is increased as the frusto-conical surface angle $\theta$ is decreased, while all other dimensional factors are held constant. In FIGURE 6, curves 65, 66 and 67 were obtained where $b_1$ equals 10 mm., S equals 4 mm. and $\theta$ equals 50°. Curve 65 represents $D_2$ equal to 2 mm. and $b_2$ equal to 0.5 mm., curve 66 represents $D_2$ equal to 4 mm. and $b_2$ equal to 1.0 mm., and curve 67 represents $D_2$ equal to 6 mm. and $b_2$ equal to 1.0 mm. In FIGURE 7, curves 75, 76 and 77 were obtained where $b_1$ equals 10 mm., S equals 4 mm. and $\theta$ equals 40°. Curve 75 represents $D_2$ equal to 2 mm. and $b_2$ equal to 0.5 mm., curve 76 represents $D_2$ equal to 4 mm. and $b_2$ equal to 1.0 mm., and curve 77 represents $D_2$ equal to 6 mm. and $b_2$ equal to 1.0 mm. As is apparent from curves 65 and 66, a chromatic aberration coefficient less than 1.0 mm. can be obtained. At 8.5 ka. these curves were parallel to the abscissa, which was due to the fact that the increase of half width $d$ was considerable. As shown in FIGURES 6 and 7, curves 67 and 77 swung up sharply at approximately 7.5 ka. and 6 ka. respectively; these curves are undesirable as an objective lens property.

Furthermore, we obtained values of 1.2 mm., 1.0 mm. and 0.7 mm. for the spherical aberration coefficient at 7 ka. when the conical surface angle $\theta$ was 60°, 50° and 40° and the other dimensional factors were the same as those represented in the case of curves 55, 65 and 75 of FIGURES 5, 6 and 7, respectively. It is to be noted from these values that a smaller spherical aberration coefficient can be obtained in accordance with a decrease of frusto-conical surface angle $\theta$.

The graph of FIGURE 8 represents the variation of the chromatic aberration of the objective lens pole pieces, as shown in FIGURE 1, in which the surface angle is 60°, aperture diameter $b_1$ is 22 mm., gap S is 4 mm. and lower pole piece diameter $D_2$ is 2 mm., 4 mm. and 6 mm. respectively. As is apparent from FIGURE 8, the curves vary as do the curves in the case of 10 mm. aperture diameter ($b_1$) in FIGURE 5. It is also noted that the same value of the coefficient, such as shown in FIGURE 5 where $b_1$ is 10 mm., can be obtained by increasing only the excitation current to a suitable value. It is assumed from this fact that the field distribution near the lower pole face is dependent only upon the geometry of the top of the lower pole, and that aperture diameter $b_1$ and gap S merely affect the maximum field (B max.). Accordingly, in this invention, very small aberration coefficients which are obtainable with a conventional lenses utilizing very small aperture and gaps, are also obtainable by increasing only the excitation current, even if the aperture and gaps are very large. These same results are also obtainable for other types of aberration coefficients, such as off-axial astigmatism and comma aberration. Furthermore, the eccentricity of the aperture diameter and the inclination of the aperture are not considered, compared with the conventional objective lens, since the shape of the field distribution that affects the electron beam passing through the aperture of the poles is dependent upon the geometry of the lower pole face.

We have, therefore, confirmed from our investigation with our novel objective lens pole pieces that the aberration coefficients depend upon parameter $D_2$, $b_1$ and $\theta$. Accordingly, these parameters must be taken into account to reduce or eliminate spherical and chromatic aberrations. That is, in general, that chromatic aberration coefficient diminishes by enlarging conical surface angle $\theta$ and by reducing the ratio of the lower pole face diameter $D_2$ to aperture diameter $b_1$. With respect to the spherical aberration coefficient, a large surface angle $\theta$ decreases the coefficent for larger excitation current. A small angle will reduce the coefficient at small excitation currents. It is undesirable to make the frusto-conical surface angle too small, since the curve of the chromatic aberration coefficient rises. Also, if the conical surface angle is made too large, the concentration of the magnetic field near the top of the lower pole piece weakens, resulting in an environment of large currents. Consequently, best results are obtained at frusto-conical angles $\theta$ between 40° and 60°. When the gap between the poles is made large, the concentration of the magnetic field of the lower pole becomes weak and the excitation current must be increased. Therefore, it is preferable to make the gap smaller than aperture diameter $b_1$. Moreover, we have confirmed that it is preferable to make the aperture of the lower pole piece very small, since this affects the maximum field. This is usually made less than one half the lower pole face diameter $D_2$.

Figure 9:
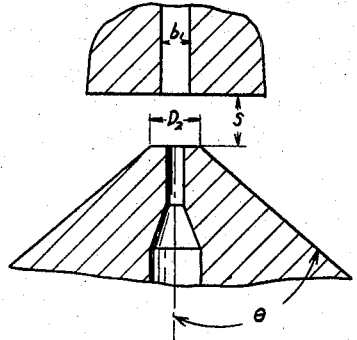
FIGURE 9 is a partial vertical section through another embodiment of our invention.

We have found, however, that when aperture diameter $b_1$ is small compared to gap S the same results heretofore described are obtained. When lower pole face diameter $D_2$ is smaller than gap S, half width $d$ depends on diameter $D_2$ and angle $\theta$. That is, except for the excitation current, aberration coefficients are decided only by the geometry of the top of the lower pole piece. Furthermore, the same aberration coefficients are obtainable in the case of a large gap only by increasing the excitation current to a suitable ratio. This type of objective lens, wherein $b_1$ is small when compared with gap S, is shown in FIGURE 9. In an actual lens, angle $\theta$ must be determined at a suitable angle because of the saturation of the lens pole piece. This angle is preferably between 40° and 60°.

Figure 10:
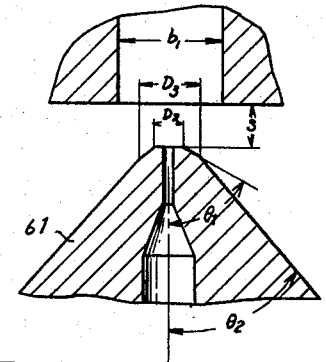
FIGURE 10 is a partial vertical section through still another embodiment of our invention.

An alternative embodiment of our invention is shown in FIGURE 10. The frusto-conical surface of pole piece 61 has two angles, $\theta_1$ and $\theta_2$, with respect to the lens axis. This cone-shaped lens, has a magnetic field distribution concentrated at the top of the lower pole piece which is greater than the concentration for the pole pieces shown in FIGURES 1 and 9. Because of this concentration, a much smaller aberration coefficient can be obtained than in the lens of FIGURE 1 from the same amount of excitation current. This is shown by the graph of FIGURE 11.

Figure 11:
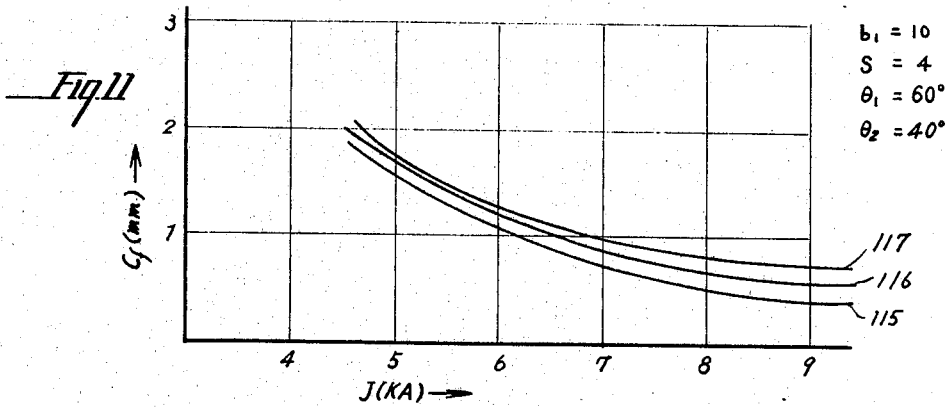
FIGURE 11 is a graph showing variation of the chromatic aberration coefficient of the embodiment shown in FIGURE 10.

FIGURE 11 illustrates the relationship between chromatic aberration $C_f$ and excitation current J(KA) in accordance with a pole piece similar to that shown in FIGURE 10. Curves 115, 116 and 117 represent chromatic aberration curves where $b_1$ equals 10 mm., S equals 4 mm., $\theta_1$ equals 60° *and* $\theta_2$ equals 40°. Curve 115 represents $D_2$ equal to 2 mm. and $D_3$ equal to 6 mm., curve 116 represents $D_2$ equal to 4 mm. and $D_3$ equals 4 mm., $\theta_1$ equals 60° and $\theta_2$ equals 40°. Curve mm. and $D_3$ equal to 18 mm. As is clear from these curves, similar results may be obtained by making aperture diameter $b_1$ small, that is, less than diameter $D_2$. It is also possible to continuously vary the conical surface of the lower pole piece by making it convex.

By employing the pole piece of the present invention both spherical and chromatic aberration can be reduced without the requirement of large excitation current. Furthermore, diminution of other aberrations such as astigmatism, based on the eccentricity of the poles is obtained since the shape of the field distribution depends almost entirely upon the geometry of the lower pole pieces. Moreover, there is very little field disturbance due to the accuracy of the lower pole piece surface, since the field distribution depends largely upon the conical surface magnetic charge.

As described herein above, we have experimented at 100 kv. accelerating voltage, but it may be possible to obtain similar results in the case of different accelerating voltages.

While we have shown and described preferred embodiments of our invention, it is to be understood that it may be otherwise embodied within the scope of the appended claims.

We claim:

1. In a magnetic electron objective lens having upper and lower pole pieces spaced apart by a distance S, each of said pole pieces having apertures having diameters $b_1$ and $b_2$ respectively, the apertures being aligned along a common axis, and said lower pole piece having a pole face diameter $D_2$ normal to the axis, the improvement comprising:

(A) said lower pole piece being formed with a continuous sidewall having at least one conical taper between 40° and 60° with respect to said axis;
(B) the diameter of $D_2$ of the lower pole face being smaller than the diameter of the aperture of the upper pole piece;
(C) the distance S between the pole pieces being less than diameter $b_1$ of the aperture of the upper pole piece; and,
(D) means for exciting said pole pieces greater than that required for saturation.

2. The improvement set forth in claim 1 wherein the conical taper forms at least two angles with said axis, the angle nearest the pole face being greater than the other angle.

3. In a magnetic electron objective lens having upper and lower pole pieces spaced apart by a distance S, each of said pole pieces having apertures having diameters $b_1$ and $b_2$ respectively, the apertures being aligned along a common axis, and said lower pole piece having a pole face diameter $D_2$ normal to the axis, the improvement comprising:

(A) said lower pole piece being formed with a continuous sidewall having at least one conical taper between 40° and 60° with respect to said axis;
(B) the diameter of $D_2$ of the lower pole face being smaller than the diameter $b_1$ of the aperture of the upper pole piece, the diameter $D_2$ being less than 6 mm. the diameter $b_1$ being less than 22 mm.;
(C) the distance S between the pole pieces being less than diameter $b_1$ of the aperture of the upper pole piece; and,
(D) means for exciting said pole pieces greater than that required for saturation.

4. The improvement set forth in claim 3 wherein the conical taper forms at least two angles with said axis, the angle nearest the pole face being greater than the other angle.

5. The improvement set forth in claim 3 wherein the diameter $b_2$ of the aperture in the lower pole piece is less than one-half the diameter $D_2$ of the lower pole face.

6. In a magnetic electron objective lens having upper and lower pole pieces spaced apart by a distance S, each of said pole pieces having apertures having diameters $b_1$ and $b_2$ respectively, the apertures being aligned along a common axis, and said lower pole piece having a pole face diameter $D_2$ normal to the axis, the improvement comprising:

(A) said lower pole piece being formed with a continuous sidewall having at least one conical taper between 40° and 60° with respect to said axis;
(B) the diameter of $D_2$ of the lower pole face being smaller than the diameter $b_1$ of the aperture of the upper pole piece, the diameter $D_2$ being typically 2 to 6 mm., and the diameter $b_1$ being typically 10 to 22 mm.;
(C) the distance S between the pole pieces being less than diameter $b_1$ of the aperture of the upper pole piece; and,
(D) means for exciting said pole pieces greater than that required for saturation.

7. The improvement set forth in claim 6 wherein the conical taper forms at least two angles with said axis, the angle nearest the pole face being greater than the other angle.

8. The improvement set forth in claim 6 wherein the diameter $b_2$ of the aperture in the lower pole piece is less than one-half the diameter $D_2$ of the lower pole face.

References Cited

UNITED STATES PATENTS

| | | | |
|---|---|---|---|
| 2,819,403 | 1/1958 | Reisner | 335—210 |
| 2,714,678 | 8/1955 | Wolff. | |
| 2,624,022 | 12/1952 | Wolff | 335—210 |
| 2,209,669 | 7/1940 | Von Borries et al. | 335—210 |

BERNARD A. GILHEANY, Primary Examiner

D. M. MORGAN, Assistant Examiner

U.S. Cl. X.R.

250—49.5

UNITED STATES PATENT OFFICE
CERTIFICATE OF CORRECTION

Patent No. 3,509,503                        April 28, 1970

Takashi Yanaka et al.

It is certified that error appears in the above identified patent and that said Letters Patent are hereby corrected as shown below:

Column 5, lines 15 and 16, cancel "equals 4mm., $\theta_1$ equals 60° and $\theta_2$ equals 40°. Curve mm." and insert -- equal to 12mm, and curve 117 represents $D_2$ equal to 6mm --.

Signed and sealed this 29th day of September 1970.

(SEAL)
Attest:

Edward M. Fletcher, Jr.                        WILLIAM E. SCHUYLER, JR.
Attesting Officer                                 Commissioner of Patents